(No Model.) 2 Sheets—Sheet 2.
A. R. BEAL.
WEIGHING SCALE.
No. 548,421. Patented Oct. 22, 1895.
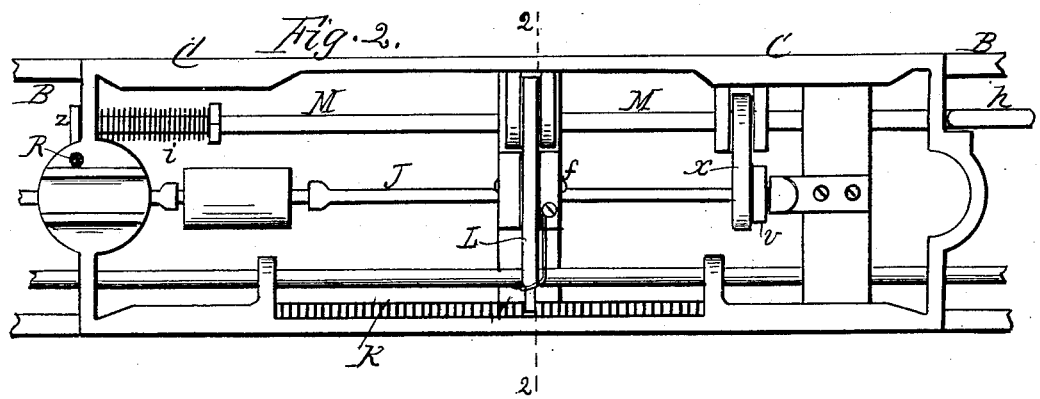
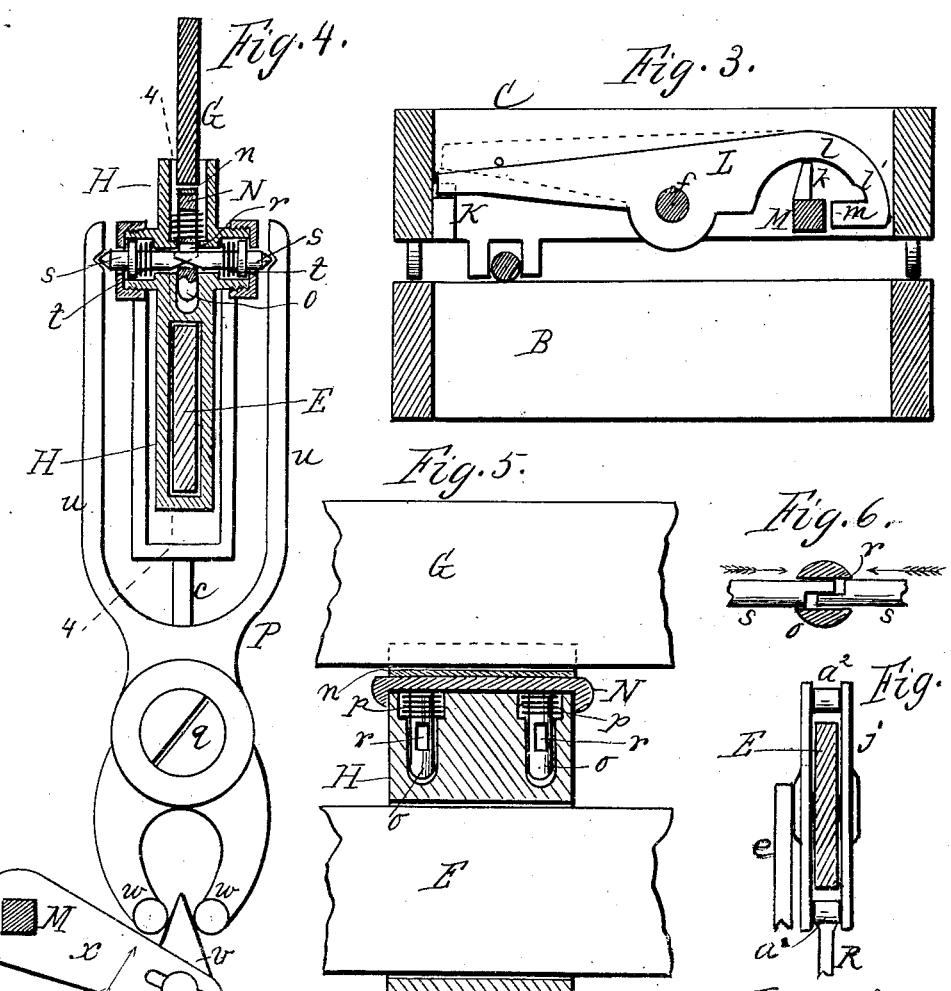

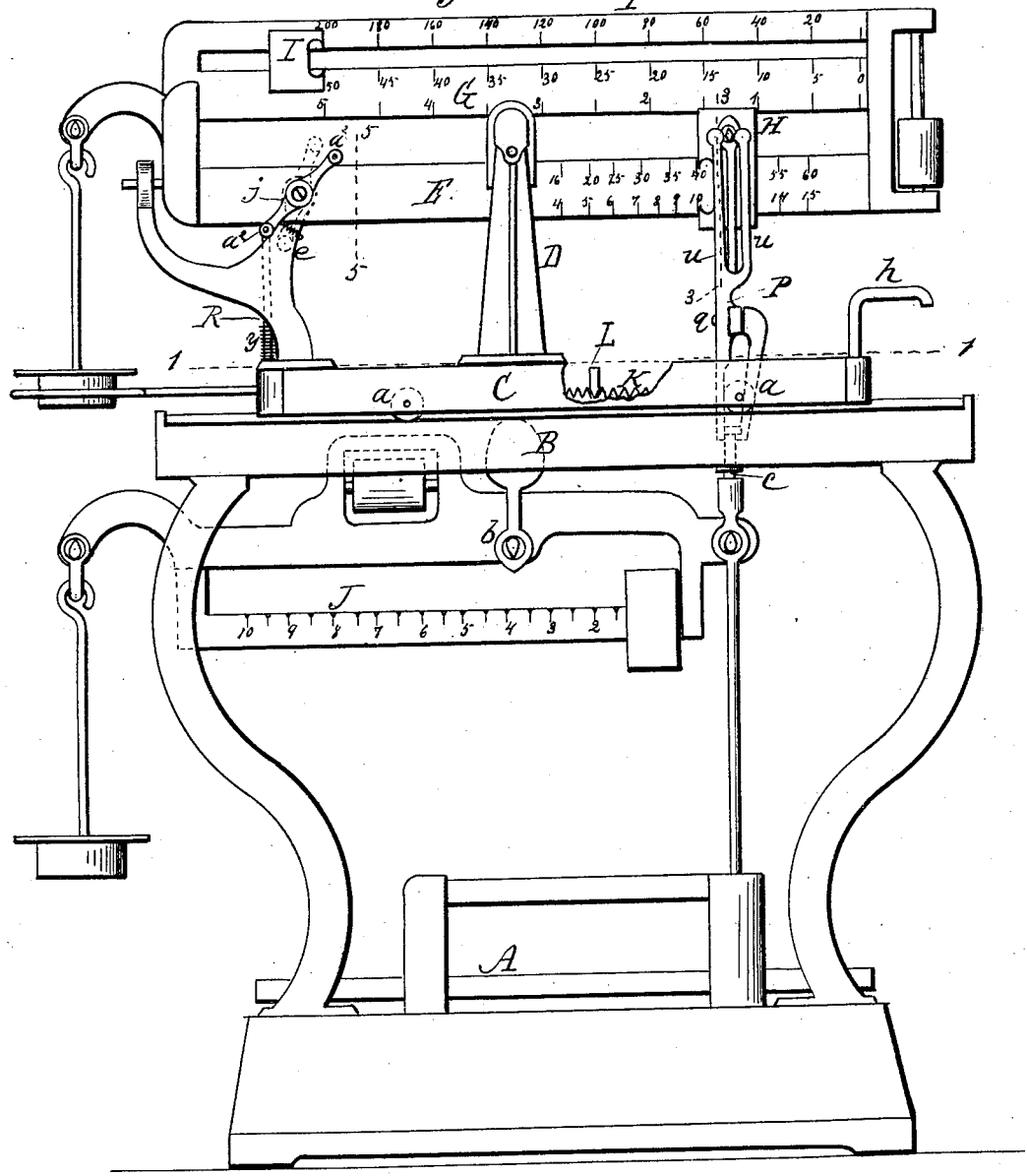

UNITED STATES PATENT OFFICE.

ALPHA R. BEAL, OF EAST BLOOMFIELD, NEW YORK.

WEIGHING-SCALE.

SPECIFICATION forming part of Letters Patent No. 548,421, dated October 22, 1895.

Application filed July 16, 1894. Serial No. 517,657. (No model.)

*To all whom it may concern:*

Be it known that I, ALPHA R. BEAL, of East Bloomfield, (P. O., Victor,) in the county of Ontario and State of New York, have invented a certain new and useful Improvement in Weighing-Scales; and I do hereby declare that the following is a full, clear, and exact description of the same, reference being had to the drawings accompanying this specification.

My improvement relates to platform-scales; and it consists in the combination and arrangement of parts hereinafter more fully described, and embodied in the claims.

In the drawings, Figure 1 is a front elevation of a platform-scale, showing my invention. Fig. 2 is a plan view of the carriage looking down from line 1 1 of Fig. 1. Fig. 3 is an enlarged cross-section of the carriage and frame in line 2 2 of Fig. 2. Fig. 4 is an enlarged cross-section in line 3 3 of Fig. 1, showing more particularly the means for locking the price-poise in position while the carriage is being shifted. Fig. 5 is a vertical section in line 4 4 of Fig. 4. Fig. 6 is a diagram showing one of the locking-pins and the slides that work therein. Fig. 7 is a cross-section in line 5 5 of Fig. 1.

A indicates the platform, which is of ordinary construction.

B is the main frame supported by the platform, and C is the carriage which moves forward and back on the frame, being provided with friction-wheels $a$ $a$ to lessen friction.

D is a standard rising from the carriage and serving as the fulcrum for the lever-work. In the example shown in the drawings the apparatus is of the kind known as a "price or computing scale," in which when a weight is placed on the platform and the price-poise has been adjusted to a given price per pound the aggregate value is indicated by a sliding poise on another beam. I do not, however, limit my invention to this particular class of scales.

E, F, and G are three scale beams, all combined together and turning on the fulcrum D. The lower beam E has a scale from 3 up to 60, more or less, which indicates price per pound, and in connection with this is used a price-poise H, which has no longitudinal movement, but the adjustment in changing from one price to another is accomplished by sliding the beam through the poise by moving the carriage. The upper beam F has a single scale from 1 upward and the middle beam G has two scales each from 1 upward. The bottom scale of the middle beam G indicates pounds when the price-poise is set at 10, and the upper scale of said middle beam and the single scale of the upper beam F both indicate aggregate values of any weight at any given price per pound by moving a counterpoise I, so as to balance the beams under the weight on the platform. This arrangement is the same as in other price-scales in use.

J is another beam, having its fulcrum at $b$ on the under side of the frame and loosely connected with the beam E by a rod connection $c$. This beam is provided with a scale and constitutes a tare-beam, and is used for indicating pounds-weight on the platform.

The beam E slides loosely through the slot of the price-poise H, and it has been found difficult to adjust the pointer accurately to the number on the scale by hand without taking too much time.

If the price-poise is set accurately by making it drop into notches on the beam, and the carriage is locked when the tooth on the price-poise drops into the notches, the draw-bar is put out of line by the setting of the price-poise unless it is set so that the tooth drops squarely into the notches without any sliding motion of the price-poise whatever. This throwing of the draw-bar out of line interferes with and destroys the accurate weighing qualities of the scale. I remedy these difficulties by the following means:

To the carriage is attached a longitudinal rack K, provided with teeth spaced to correspond with the sub-divisions of the scale, and to the main frame is pivoted at $f$ a pawl L, capable of being thrown into and out of engagement with the rack. The teeth of the rack and the end of the pawl are wedge-shaped, and when the scale-beam is adjusted through the poise so as to bring the desired number approximately to the pointer of the poise, if there is any discrepancy in the adjustment the pawl, striking down into the rack, will draw the beam exactly to place. If desired the arrangement may be reversed, the rack being attached to the frame and the pawl to the carriage.

By the means above described both edges of the scale-beam E can be made smooth and unnotched, insuring easy movement of the beam through the poise and obviating many difficulties where the edge of the beam is notched.

M is a longitudinal shaft attached to the carriage C and provided with a handle $h$ at one end, by which it is turned, and a tension-spring $i$ at the other, which tends to hold it in one position. On this shaft is a cam $k$, resting in a half-circular camway $l$ of the pawl and striking a lug $m$ of the pawl to throw the latter up when the shaft is turned against the spring. The rear part of the camway $l$ is notched, as shown at $l'$, by which means the pawl makes a quick movement at the first turn of the shaft in order to engage with the rack. When once adjusted to a given number on the scale-beam the price-poise H must be locked to the beam to prevent displacement, but in order to move the beam through the poise it must be unlocked again. The arrangement for locking and unlocking is shown in Figs. 4, 5, and 6. In the upper end of the poise H is mounted a gib or washer N, which is movable up and down and fits the under side of the scale-beam, a packing $n$ being interposed between them. This gib is provided with two pins $o$ $o$, which rest loosely in sockets in the poise and it is pressed up by springs $p$ $p$ around the pins. The pins are provided with cross-slots $r$ $r$, in which enter the ends of slides $s$ $s$ from opposite sides of the poise, the ends of the slides being wedge-shaped and lapping past each other, as shown in the cross-section, Fig. 6. When the slides are forced inward the gib is depressed, thus relieving it from contact with the edge of the beam. The slides are thrown out by coiled springs $t$ $t$.

P is a clamp consisting of two arms pivoted together at $q$, like a pair of shears, said arms extending up on opposite sides of the poise H and there provided with two branches $u$ $u$, with heads that come opposite the ends of the slides $s$ $s$. When the arms are compressed, the heads force the slides inward and release the gib from the scale-beam, as before described. The clamp is operated by a wedge $v$, which rests between pins $w$ $w$ on the lower ends of the arms of the clamp. The wedge is attached to a crank-arm $x$, which in turn is attached to the shaft M and is thrown by it.

In order to level the scale-beam and hold it so that it can be run freely through the poise, I employ a locking device, as follows.

R, Figs. 1 and 7, is a rod that moves freely up and down in bearings of the carriage, its upper end resting in line with the scale-beam E, but out of contact therewith. It is forced down to a stop by a spring $y$, and it is raised against the spring by a crank-arm $z$ on the shaft M. The action of turning the shaft to release the pawl raises the rod.

$j$ is a yoke embracing the scale-beam and pivoted centrally to a bearing $e$ of the carriage.

$a^2$ $a^2$ are stops on the yoke which strike the edges of the scale-beam. The lower end of the yoke is jointed to the upper end of rod R, and when the latter is thrown it raises the scale-beam to a level position and the yoke clamps upon both edges and holds it firmly in place.

Having described my invention, I do not claim simply and broadly a means for clamping and holding the carriage at any adjustment; but

What I claim as new, and desire to secure by Letters Patent, is—

1. In a weighing scale, the combination of a bed plate, a carriage movable forward and back thereon, a scale beam attached to the carriage and provided with a scale, a poise through which the scale beam slides, a rack whose teeth are wedge-shaped and spaced to accord with the divisions of the scale on the beam, a pawl engaging with the rack, and means for operating the pawl, the whole so arranged, as described, that the engagement of the pawl with the teeth of the rack will move the carriage and adjust the divisions of the scale accurately with the poise as specified.

2. In a weighing scale, the combination of a bed plate, a carriage movable forward and back thereon, a scale beam provided with a scale attached to the carriage, a poise through which the scale beam slides, a rack whose teeth are wedge-shaped and spaced to accord with the divisions of the scale on the beam, a pawl engaging with the rack, a cam and shaft for operating the pawl, a locking attachment connected with the poise, and means for operating the locking attachment, the whole so arranged, as described, that the engagement of the pawl with the rack will move the carriage and adjust the divisions of the scale accurately with the poise, and the poise will then be locked to the scale beam, as specified.

3. In a weighing scale, the combination of a movable carriage, a scale beam pivoted thereto so as to move with the carriage, a poise through which the scale beam slides, a gib connected with the poise, provided with slotted pins, slides with wedge-shaped ends entering the slots of the pins, a clamp operating on the slides, and means for actuating the clamp, as specified.

In witness whereof I have hereunto signed my name in the presence of two subscribing witnesses.

A. R. BEAL.

Witnesses:
  R. F. OSGOOD,
  A. W. WILBUR.